UNITED STATES PATENT OFFICE.

CHARLES W. GROSS, OF NAPA, CALIFORNIA, ASSIGNOR OF ONE-HALF TO EDWARD W. ROBINSON, OF NAPA, CALIFORNIA.

LEATHER-TOUGHENING COMPOSITION AND PROCESS OF MAKING SAME.

1,149,645. Specification of Letters Patent. Patented Aug. 10, 1915.

No Drawing. Application filed September 8, 1913. Serial No. 788,651.

*To all whom it may concern:*

Be it known that I, CHARLES W. GROSS, a citizen of the United States, residing at Napa, in the county of Napa and State of California, have invented new and useful Improvements in Leather-Toughening Composition and Processes of Making Same, of which the following is a specification.

The present invention relates to an improved composition for toughening leather, and to a process of making the same.

In making my improved composition, I melt two-thirds of a pint, dry measure, of rosin, and into the rosin when melted, I put one-eighth of a pint, dry measure, of red shellac. I next heat one liquid pint of linseed oil and mix it with one liquid pint of melted mutton tallow. I next pour the hot mixture of linseed oil and mutton tallow into the melted rosin and shellac, then stir the mixture, and then allow it to cool off until it becomes lukewarm. I then pour in one pint of gasolene. It is found that if the soles of shoes are allowed to stand overnight in this liquid composition, and then removed, and the composition wiped off, they are rendered about twice as durable as before. Thus, at a cost of not over five cents the life of a pair of shoes is practically doubled.

While the above are the preferred ingredients of my improved composition, an inferior, although good, composition can be made by omitting either the linseed oil or the mutton tallow using a correspondingly larger quantity of the other of these ingredients, and linseed oil and mutton tallow may be regarded as to a certain extent equivalents. In like manner an inferior composition can be made by omitting the shellac and increasing the quantity of rosin. The gasolene is added for the purpose of rendering the composition more fluid and therefore more easily able to penetrate the pores of the leather, and the gasolene, of course, evaporates and leaves the remaining ingredients embedded in said pores.

Any other light volatile liquid, which will perform the same office as gasolene in this composition, is to be regarded as its equivalent.

I claim:—

1. A composition comprising rosin, red shellac, linseed oil, mutton tallow and gasolene substantially in the proportions specified.

2. The process of making a leather toughening composition which consists in melting rosin and mixing therewith dry shellac, adding to the mixture hot linseed oil and mutton tallow, agitating the mixture, and adding gasolene thereto when lukewarm.

In testimony whereof I have hereunto set my hand in the presence of two subscribing witnesses.

CHARLES W. GROSS.

Witnesses:
F. M. WRIGHT,
D. B. RICHARDS.